(12) United States Patent
Aggarwal et al.

(10) Patent No.: US 8,756,355 B2
(45) Date of Patent: Jun. 17, 2014

(54) METHODS AND STRUCTURE FOR CONFIGURING A SERIAL ATTACHED SCSI DOMAIN VIA A UNIVERSAL SERIAL BUS INTERFACE OF A SERIAL ATTACHED SCSI EXPANDER

(75) Inventors: Kaushalender Aggarwal, Haryana (IN); Mandar Joshi, Maharashtra (IN); Saurabh B. Khanvilkar, Thane (IN); Rakesh Verma, Mumbai (IN)

(73) Assignee: LSI Corporation, Milpitas, CA (US)

( * ) Notice: Subject to any disclaimer, the term of this patent is extended or adjusted under 35 U.S.C. 154(b) by 192 days.

(21) Appl. No.: 13/466,347

(22) Filed: May 8, 2012

(65) Prior Publication Data
US 2013/0304952 A1 Nov. 14, 2013

(51) Int. Cl.
*G06F 13/00* (2006.01)
*G06F 3/06* (2006.01)
*G06F 13/40* (2006.01)
*H04L 12/24* (2006.01)

(52) U.S. Cl.
CPC ............ *G06F 3/067* (2013.01); *G06F 13/4045* (2013.01); *G06F 13/4022* (2013.01); *H04L 41/12* (2013.01)
USPC .............................. 710/104; 710/200; 710/300

(58) Field of Classification Search
CPC ... G06F 13/4022; G06F 13/4045; G06F 3/67; H04L 41/12
USPC ............................ 710/104, 200, 300; 709/229
See application file for complete search history.

(56) References Cited

U.S. PATENT DOCUMENTS

| | | | | |
|---|---|---|---|---|
| 7,028,106 B2* | 4/2006 | Foster et al. | ....................... | 710/2 |
| 7,124,234 B2* | 10/2006 | Marushak et al. | ............ | 710/316 |
| 7,353,302 B2* | 4/2008 | Seto | ............................... | 710/36 |
| 7,377,800 B2* | 5/2008 | Gasser | .......................... | 439/374 |
| 7,584,319 B1* | 9/2009 | Liao et al. | ...................... | 710/317 |
| 7,644,168 B2* | 1/2010 | Grieff et al. | ..................... | 709/229 |
| 7,668,925 B1* | 2/2010 | Liao et al. | ..................... | 709/212 |
| 7,882,281 B2* | 2/2011 | Jones et al. | .................... | 710/36 |
| 7,882,509 B2* | 2/2011 | Jones et al. | ................... | 719/326 |
| 8,078,906 B2* | 12/2011 | Yochai et al. | ................. | 714/6.3 |
| 8,099,532 B2* | 1/2012 | Cagno et al. | .................... | 710/38 |
| 8,127,059 B1* | 2/2012 | Carr et al. | ....................... | 710/74 |
| 8,312,312 B2* | 11/2012 | Oikawa et al. | ................. | 714/4.1 |
| 8,356,198 B2* | 1/2013 | Myrah et al. | .................. | 713/324 |
| 8,370,570 B2* | 2/2013 | Motonaga et al. | ............ | 711/114 |
| 8,443,117 B2* | 5/2013 | Katano et al. | ................... | 710/19 |
| 2005/0066100 A1* | 3/2005 | Elliott et al. | .................. | 710/300 |
| 2006/0004935 A1* | 1/2006 | Seto et al. | ....................... | 710/62 |
| 2006/0101171 A1* | 5/2006 | Grieff et al. | ..................... | 710/36 |

(Continued)

OTHER PUBLICATIONS

"HP SAS Expander Card QuickSpecs" DA-13232 North America—version 14—Oct. 19, 2011, 15 pages.

(Continued)

*Primary Examiner* — Ryan Stiglic
(74) *Attorney, Agent, or Firm* — Duft Bornsen & Fettig

(57) ABSTRACT

Methods and structure are provided for managing a Serial Attached SCSI (SAS) domain via Universal Serial Bus (USB) communications. The system comprises a SAS expander. The SAS expander comprises a plurality of physical links, a USB interface, and a control unit. The control unit is operable to receive USB packets via the USB interface, to determine SAS management information based upon the received USB packets, and to alter a configuration of the SAS domain based upon the SAS management information determined from the USB packets.

20 Claims, 3 Drawing Sheets

(56) References Cited

U.S. PATENT DOCUMENTS

| | | | |
|---|---|---|---|
| 2006/0156055 A1* | 7/2006 | Cherian et al. | 714/4 |
| 2006/0235937 A1* | 10/2006 | Wu et al. | 709/214 |
| 2006/0271722 A1* | 11/2006 | Marushak et al. | 710/316 |
| 2007/0070833 A1* | 3/2007 | Long | 369/30.64 |
| 2007/0070994 A1* | 3/2007 | Burroughs et al. | 370/381 |
| 2007/0106764 A1* | 5/2007 | Mansfield | 709/220 |
| 2007/0255868 A1* | 11/2007 | Chahal et al. | 710/62 |
| 2008/0189723 A1* | 8/2008 | Elliott et al. | 719/326 |
| 2008/0313658 A1* | 12/2008 | Cagno et al. | 719/326 |
| 2009/0007154 A1* | 1/2009 | Jones | 719/326 |
| 2009/0007155 A1* | 1/2009 | Jones et al. | 719/327 |
| 2009/0052442 A1* | 2/2009 | Chen et al. | 370/389 |
| 2010/0070662 A1* | 3/2010 | Odenwald et al. | 710/37 |
| 2010/0088469 A1* | 4/2010 | Motonaga et al. | 711/113 |
| 2010/0115073 A1* | 5/2010 | Odenwald et al. | 709/223 |
| 2010/0122021 A1* | 5/2010 | Lee et al. | 711/103 |
| 2011/0125943 A1* | 5/2011 | Oikawa et al. | 710/106 |
| 2011/0231571 A1* | 9/2011 | Joshi et al. | 709/236 |
| 2011/0246803 A1* | 10/2011 | Myrah et al. | 713/324 |
| 2012/0102251 A1* | 4/2012 | Ranjan et al. | 710/300 |
| 2012/0254578 A1* | 10/2012 | Myrah et al. | 711/170 |
| 2012/0284435 A1* | 11/2012 | Myrah et al. | 710/74 |
| 2012/0290762 A1* | 11/2012 | Kabra et al. | 710/305 |
| 2012/0317319 A1* | 12/2012 | Myrah et al. | 710/74 |

OTHER PUBLICATIONS

"LSI SAS 2×36 SAS"Expander download from the internet on May 8, 2012 S:\71000 LSI Logic Corp\71000.271 11-2313\IDS\LSI SAS 2×36.htm.

SuperChassis 836E1-R800V / 836E1-R800B download from the internet on May 8, 2012 S:\71000 LSI Logic Corp\71000.271 11-2313\IDS\Supermicro Products Chassis 3U SC836E1-R800V SC836E1-R800B.htm.

\* cited by examiner

METHODS AND STRUCTURE FOR CONFIGURING A SERIAL ATTACHED SCSI DOMAIN VIA A UNIVERSAL SERIAL BUS INTERFACE OF A SERIAL ATTACHED SCSI EXPANDER

BACKGROUND

1. Field of the Invention

The invention relates generally to the field of Serial Attached SCSI (SAS) domains, and more specifically relates to SAS expanders having enhanced functionality.

2. Discussion of Related Art

In the field of Serial Attached SCSI (SAS), various interconnected end devices and routing elements may be referred to as a "SAS domain." When establishing or modifying a SAS domain, components of the SAS domain should be properly configured in order to ensure that communications will be correctly routed when the SAS domain is operational. This information may indicate zoning and permissions within the SAS domain, routing information for the SAS domain, the configuration of various ports within the SAS domain, and other features. Typically, each SAS expander within the domain will need at least some of this information to be configured, but the specific values used to configure each expander will vary. Typically, present configuration methods utilize Serial Management Protocol (SMP) over a SAS port from a management client (e.g., a management application residing on an attached SAS initiator or host) in order to configure elements of the SAS domain.

Unfortunately, many portable devices such as laptops, smartphones, tablets, and other computing systems do not generally include external SAS interfaces. This typically means that it is hard for mobile general-purpose hardware (i.e., general purpose computing systems that are not directly wired into the SAS domain for storage, processing and other purposes) to manage the configuration of the SAS domain. This is undesirable because a systems engineer wishing to manage the SAS domain may desire to use such equipment to manage the SAS domain.

Thus it is an ongoing challenge to enhance the ways in which a SAS domain may be managed and configured by external devices.

SUMMARY

The present invention addresses the above and other problems, thereby advancing the state of the useful arts, by providing methods and structure for enhanced Serial Attached SCSI (SAS) expanders that include Universal Serial Bus (USB) interfaces for management functions. The USB interface may be used to manage the SAS domain, thereby enhancing the number and type of devices that may interact with the SAS domain and configure its components.

In one aspect hereof, a system is provided for managing a Serial Attached SCSI (SAS) domain via Universal Serial Bus (USB) communications. The system comprises a SAS expander. The SAS expander comprises a plurality of physical links, a USB interface, and a control unit. The control unit is operable to receive USB packets via the USB interface, to determine SAS management information based upon the received USB packets, and to alter a configuration of the SAS domain based upon the SAS management information determined from the USB packets.

Another aspect hereof provides a method for managing a Serial Attached SCSI (SAS) domain via Universal Serial Bus (USB) communications. The method comprises receiving, at a USB interface of a SAS expander, USB packets. The method also includes determining, via a control unit of the SAS expander, SAS management information based upon the received USB packets, and altering a configuration of the SAS domain based upon the SAS management information determined from the USB packets.

DETAILED DESCRIPTION OF THE DRAWINGS

Figure 1:
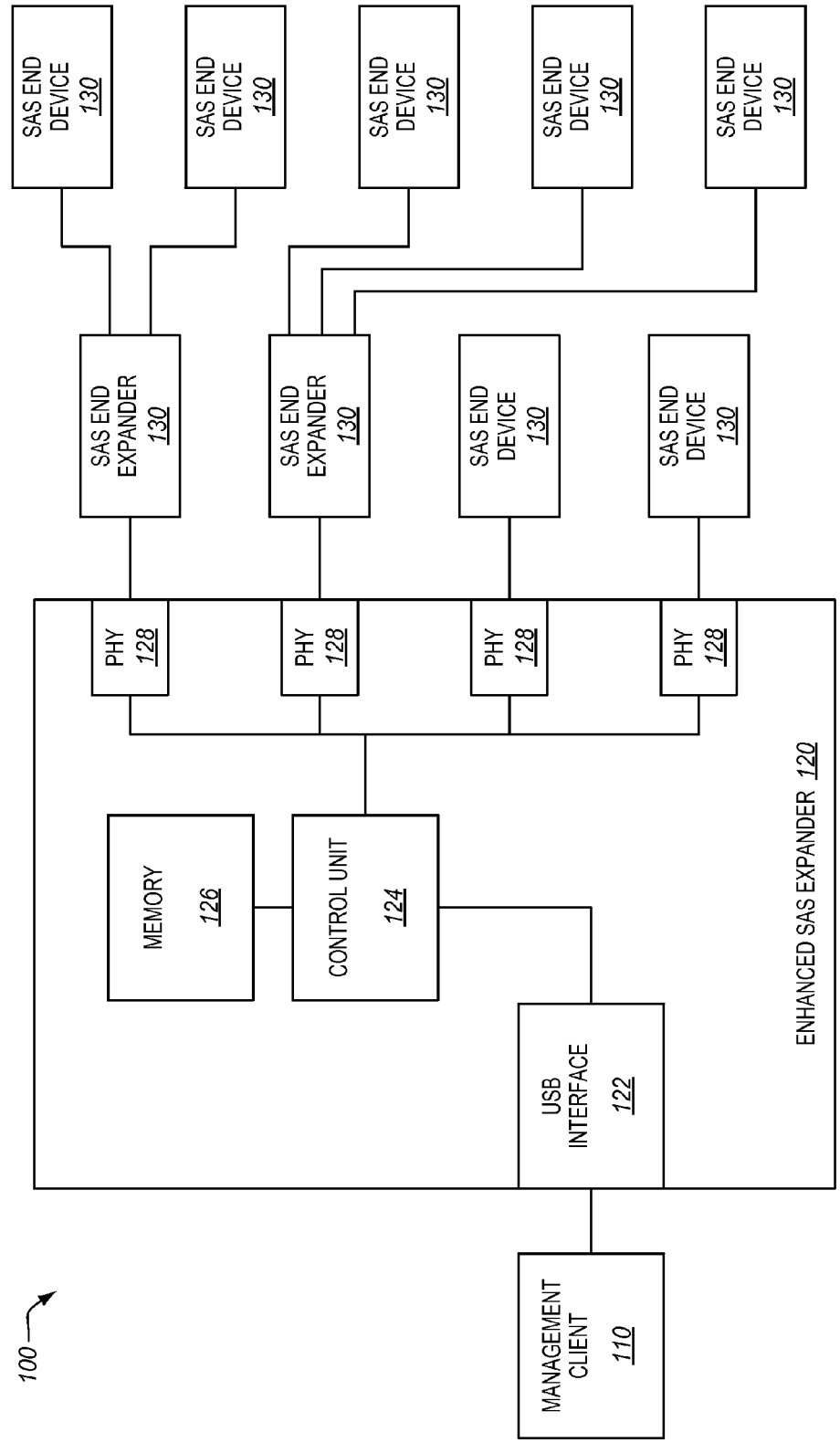
FIG. 1 is a block diagram of an exemplary SAS domain in accordance with features and aspects hereof.

FIG. 1 is a block diagram of an exemplary Serial Attached SCSI (SAS) domain 100 in accordance with features and aspects hereof. According to FIG. 1, SAS domain 100 includes enhanced SAS expander 120 and multiple SAS devices 130. SAS expander 120 has been enhanced to include a Universal Serial Bus (USB) interface that can be used by a management client 110 to manage and/or configure SAS domain 100, thereby providing enhanced accessibility to management features of SAS domain 100.

Management client 110 comprises any system, component, or device operable to communicate with SAS domain 100 by providing USB packets to SAS expander 120. Typically, management client 110 includes a USB interface, a memory, and a processor for implementing instructions used to transmit and receive USB packets. For example, management client 110 could be a laptop, a smartphone, a USB flash drive implementing solid state memory, or another computing component.

Enhanced SAS expander 120 includes USB interface 122, control unit 124, memory 126, and PHYs 128. SAS expander 120 may manage routing within SAS domain 100 between various SAS initiators and targets in order to facilitate communications between those devices. USB interface 122 of SAS expander 120 is operable to receive and transmit USB packets sent to and from management client 110. Control unit 124 comprises any system, component, or device operable to manage the operations of SAS expander 120. For example, control unit 124 may comprise a general purpose processor implementing programmed instructions or custom circuitry implementing logic for performing tasks for managing SAS expander 120.

Control unit 124 may process the received USB packets, and may determine, based upon processing the received USB packets, one or more pieces of SAS management information used for configuring SAS domain 100. SAS management information includes any information that can be used to alter the configuration of components of SAS domain 100. For example, the SAS management information could include information used to alter a routing table at SAS expander 120 (or, for that matter, any another device of SAS domain 100), could include information for changing routing attributes, could include information for reconfiguring a port at a SAS expander (e.g., to make the port a wide port comprising multiple PHYs), etc. SAS management information does not include host I/O requests directed to logical volumes, or other similar processing operations used to retrieve data stored in SAS domain 100, as these operations do not alter the configuration of SAS domain 100, but rather simply utilize SAS domain 100 as SAS domain 100 is currently configured.

Based on the determined SAS management information, control unit 124 may alter the configuration of SAS domain 100 (e.g., by altering the configuration of one or more components of SAS domain 100). For example, control unit 124 may alter SAS routing or zoning tables stored in memory 126, or control unit 124 may generate and transmit SAS communications to one or more other SAS devices of SAS domain 100 in order to manage other SAS devices. Thus, control unit 124, by analyzing received USB packets, is capable of performing SAS management functions on behalf of management client 110.

Memory 126 comprises any system, component, or device operable to store data for enhanced SAS expander 120. For example, memory 126 may be a volatile or a non-volatile memory internal to SAS expander 120. Memory 126 may be used to store instructions for operating control unit 124, and/or may maintain SAS configuration information for SAS expander 120.

PHYs 128 comprise SAS physical links and associated logic for managing said physical links, as defined by the SAS specification. Enhanced SAS expander 120 may include any number of PHYs configured into any number of ports, as well understood by those of ordinary skill in the art.

SAS devices 130 may comprise any combination of SAS expanders and/or end devices. For example, SAS devices 130 may comprise SAS initiators (such as hosts for SAS domain 100), SAS targets (such as storage devices, interfaces, etc.), and SAS expanders. Note that the particular arrangement of components described herein is merely intended to be exemplary, and one of ordinary skill in the art will appreciate that the specific arrangement and configuration of SAS domain 100 is merely a matter of design choice. For example, SAS domain 100 may include any number of SAS devices 130 in any combination indicated in the SAS standards defined by the T10 committee. The arrangement and configuration of the various components of SAS domain 100 may be chosen in accordance with SAS 2.1 specification of the T10 Committee, Revision 04a, 5 Feb. 2010, herein incorporated by reference.

While in operation, SAS expander 120 receives USB packets via USB interface 122, analyzes the received packets to determine SAS management information, and then uses the SAS management information in order to alter the configuration of SAS domain 100. Thus, SAS domain 100 may be reconfigured by an external device without the need for dedicated SAS management ports.

Figure 2:
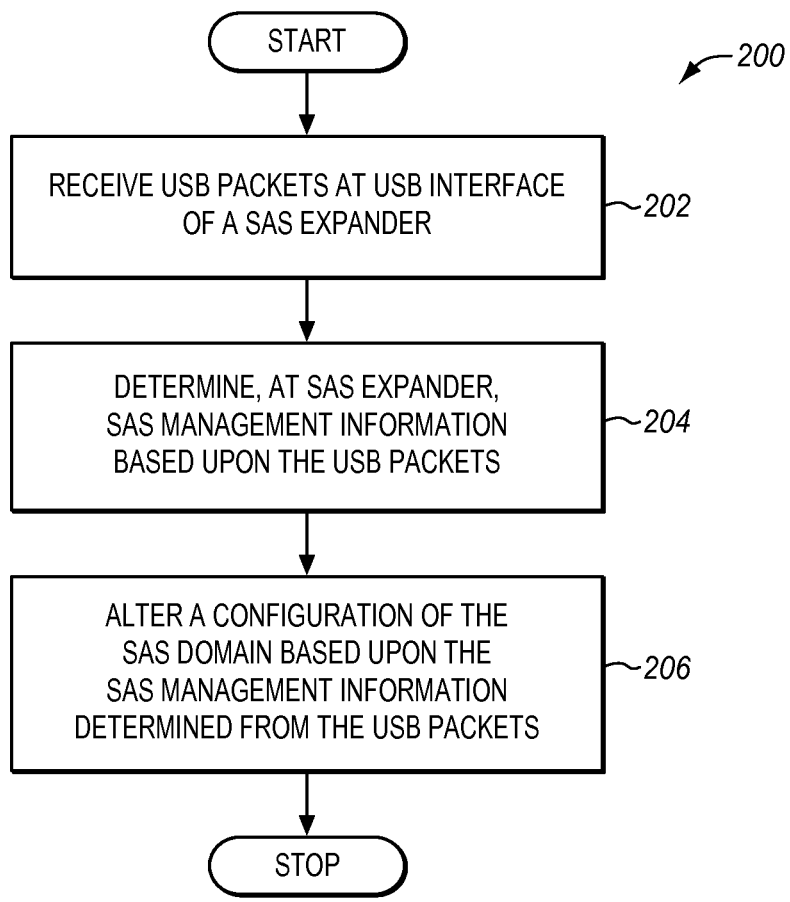
FIG. 2 is a flowchart describing an exemplary method in accordance with features and aspects hereof to manage a SAS domain via USB communications.

FIG. 2 is a flowchart describing an exemplary method 200 in accordance with features and aspects hereof to manage a SAS domain via USB communications. The method of FIG. 2 may be operable in a SAS domain such as described above with regard to FIG. 1.

In step 202, a SAS expander receives USB packets at a USB interface. The USB packets may be received via any USB device coupled to the USB interface of the SAS expander. Typically, the received USB packets will comprise data packets, handshake packets, token packets, etc.

In step 204, the SAS expander determines SAS management information based upon the received USB packets. This may be performed in any number of ways. For example, USB data packets may include certain identifiable segments of data. Each segment of data may be associated with a different piece of SAS management information. Thus, when a control unit of the SAS expander retrieves these segments of data, it may look up each segment in memory to determine a corresponding piece of SAS management information. For example, certain data segments may indicate a SAS address (e.g., a World Wide Name (WWN) or other identifier), other data segments may indicate a type of parameter to modify (e.g., the configuration of a port, routing attributes of a port, SAS zoning information, SAS routing information, etc.), and yet another data segment may indicate what value to change the parameter to. Thus, by looking up each received segment of data, a SAS command can be assembled to modify the configuration of the SAS domain, and the SAS communication (or Serial Management Protocol (SMP) communication, or Serial SCSI Protocol (SSP) communication, or Serial ATA Tunneling Protocol (STP) communication) can then be sent to the relevant SAS device. This process of directly translating USB packets into SAS management information may require a substantial amount of memory at the SAS expander, because there are a fairly significant number of different SAS commands and parameters that would need to be correlated with different segments of USB data. Note that in one embodiment, multiple USB data segments may be assembled into a larger data segment that is then translated into a piece of SAS management information.

In another embodiment, SAS management information could be encapsulated in a USB wrapper within a USB data packet. As such, the SAS management information would be generated in its native format at a management client and wrapped before being transmitted to the USB interface of the SAS expander. The SAS expander, upon receiving the USB packets, could process the USB packets to determine that pieces of SAS management information (e.g., SAS frames) were wrapped therein. The SAS expander could then unwrap the pieces of SAS management information from the USB packets. Upon determining the SAS management information, the expander may determine how to alter the configuration of the SAS domain. Note that, as a matter of design choice, multiple SAS frames could be wrapped within a single USB packet, multiple USB packets could be used to package a single SAS frame (which would then be re-assembled), or there could be a one-to-one correspondence of USB packets to SAS frames and/or pieces of SAS management information.

In step 206, the SAS expander alters a configuration of the SAS domain based upon the SAS management information determined from the SAS packets. This could comprise a number of different processes. For example, if the SAS management information indicates a request to change a parameter of the SAS expander itself (such as a locally stored zoning table, routing table, configuration of a port, routing attribute of a port, WWN for the expander, etc.), then the SAS expander may alter an internal memory in order to perform the alteration. The SAS expander may further report the alteration to other components of the SAS domain in order to ensure that other devices of the SAS domain account for the change in configuration. For example, if the change is a change to the configuration of a port, such as assembling multiple PHYs into a wide port, then other coupled devices may need to be informed of that change in order to ensure that the wide port is properly calibrated between the devices. As will be understood to those of skill in the art, many changes in configuration of a SAS domain need not affect the entire domain, although many changes may have a "trickle-down" effect that impacts multiple SAS devices.

If the SAS management information is directed to another SAS device, then the SAS expander may generate one or more SAS management commands (e.g., Serial Management Protocol (SMP) commands, Serial SCSI Protocol (SSP) commands, Serial ATA Tunneling Protocol (STP) commands) in order to instruct the other SAS device about the requested change. SAS management commands may also be generated in order to coordinate the requested change between multiple SAS devices (e.g., in order to coordinate the creation of a wide port at each of two coupled devices).

For example, if the SAS management commands are sent as SMP messages, then SMP Configure Route Info, SMP Configure Zone SMPs, SMP Phy Control, and/or SMP Phy Test commands may be used to perform the management. If the SAS management commands are sent as SSP messages, then SSP inquiry, SSP Report LUNs, and SSP Send/Receive Diagnostics commands could be used. Further, SSP Read/Write Buffer Commands could be used to update firmware on SAS devices, update manufacturing data stored at a SAS device, etc. Similarly, STP protocol can also be used to send/receive STP protocol related commands.

Figure 3:
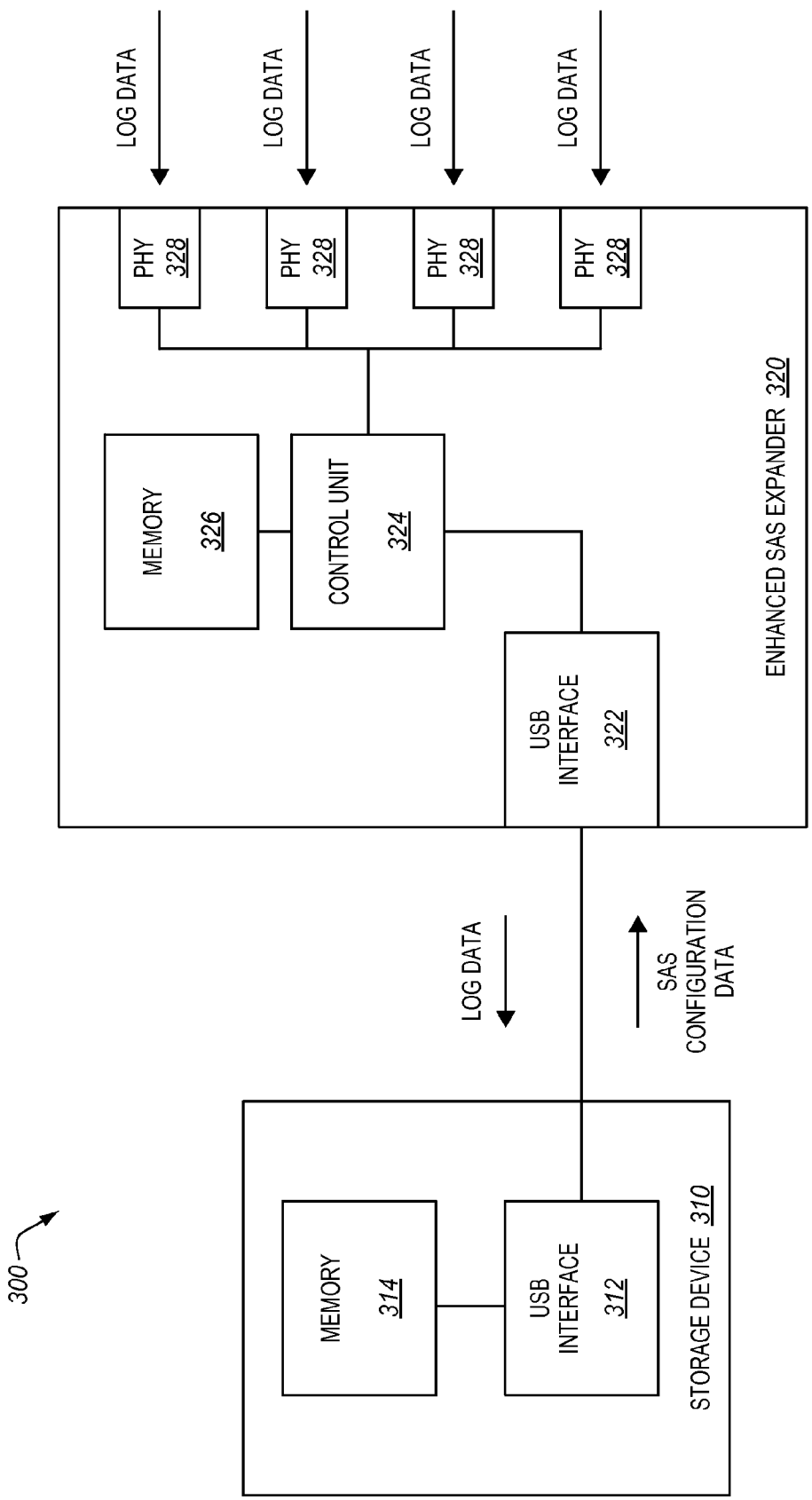
FIG. 3 is a block diagram illustrating a further exemplary SAS domain in accordance with features and aspects hereof.

FIG. 3 is a block diagram illustrating a further exemplary SAS domain 300 in accordance with features and aspects hereof. According to FIG. 3, enhanced SAS expander 320 includes a number of components similar to those of SAS expander 120 described above with regard to FIG. 1. For example, SAS expander 320 includes a USB interface 322, a control unit 324, a memory 326, and multiple PHYs 328.

However, in this embodiment, enhanced SAS expander 320 is coupled to a storage device 310 (such as a "USB key" or "flash drive") that is accessible via USB interface 322. Storage device 310 includes USB interface 312, and memory 314. Memory 314 may include any form of data storage component, but will typically comprise non-volatile storage such as solid state memory components. Note that storage device 310 may be powered via USB interface 322 in order to allow storage device 310 to access and provide stored data to enhanced SAS expander 320 without a need for an internal power source.

Storage device 310 may be utilized by enhanced SAS expander 320 for a number of purposes. Note that in following embodiments where SAS expander 320 implements two-way communications with storage device 310 in order to write to and read from memory 314, any number of appropriate SAS-USB translation and wrapping techniques, described above with regard to method 200, may be programmed into USB interface 312 and/or USB interface 322 in order to ensure that data is properly transferred between the two devices.

In one embodiment, SAS expander 320 utilizes USB interface 322 to store configuration data for the SAS domain onto storage device 310. This data may then be used as a backup for the SAS domain, or may be used at a later date to restore the configuration of the SAS domain. In order to acquire the SAS configuration data for the SAS domain intended for storage, the SAS expander may transmit a series of SAS management commands, such as SMP, STP, or SSP messages, to devices of the SAS domain, and receive a series of responses describing the configuration of the coupled devices (e.g., routing tables, zoning tables, WWNs, WWNs of coupled devices, etc.). This information may then be stored in a table, database, or other convenient format at memory 314 so that a SAS expander can use the information to restore the configuration of the SAS domain (or selected elements thereof).

For example, at a later date, when storage device 310 is connected to the SAS expander again, the SAS expander may review memory 314 and determine that it includes SAS configuration information. Control unit 324 may then determine that it is appropriate to restore the configuration of the SAS domain using the information in memory 314 of storage device 310. This determination could be decided, for example, based upon a received user request, based upon versioning information, or based upon detection of an error at SAS domain 300. Thus, control unit 314 may begin reviewing the configuration information stored in memory 314, and may proceed to issue commands to reconfigure elements of SAS domain 300. In one embodiment, the alteration commands are issued selectively, such that control unit 324 does not request an alteration to a SAS device unless the parameter stored in memory 314 for the SAS device is different than the one that is being currently used by the SAS device. Naturally, this may include querying other SAS devices in order to determine what parameters they are currently using.

In another embodiment, control unit 324 may utilize memory 314 as a replacement to, or extension of, memory 326. In such an embodiment, SAS configuration data stored at memory 314 can be used by control unit 324 for zoning tables, routing tables, etc. This may provide a benefit over memory 326 in that it may be hard to alter large portions of memory 326 all at once, while memory 314, particularly if it is a solid state memory, may have a faster transfer rate for large data transfers (even if memory 314 has a higher latency). Furthermore, memory 314 may provide a greater amount of available storage than the potentially limited amount allowed by memory 326.

In another embodiment, control unit 324 may acquire and/or store log data and/or status information for SAS domain 300 at storage device 310, so that the data is placed into a portable, easily accessible format for a system engineer. In this embodiment, control unit 324 may configure routing at the SAS domain in order to receive SAS log information, or may actively query SAS devices (e.g., on a regular basis, such as periodically) in order to accumulate such information. For example, status information may be acquired as SCSI Enclosure Services (SES) status reports, or may be received as SMP Status Reporting Commands such as Report General, Report Manufacturer Information, Report PHY Error Log, Zoning Status Report SMP Commands, and others. The log and/or status information may then be transferred to memory 314 for later access. Memory 314 can then be reviewed by any suitable device in order to review the status of the SAS domain.

In another embodiment, storage device 310 may be used as a "key" to enable enhanced features at SAS expander 320. For example, storage device 310 could include a passcode or key in memory 314. Upon the connection of storage device 310 with enhanced SAS expander 320, control unit 324 may analyze memory 314 and detect the key. Control unit 324 may then analyze the key to determine whether it is valid. This could be performed by comparing the key value to a list of known and acceptable values, analyzing the key with an algorithm and determining if the result of the algorithm is acceptable, or any other acceptable data security technique. If the key is valid, control unit 324 may then enable enhanced features at SAS expander 320 (or control unit may even disable features at SAS expander 320). For example, in environments where security is important, SAS expander may deny any attempt by an external device to alter the SAS domain until a valid key is provided.

In another embodiment, upon detection of a valid key, enhanced features are implemented and storage device 310 may be decoupled from USB interface 322 without disabling those enhanced features. For example, storage device 310 could be purchased by a user in order to increase the processing speed of a SAS device. SAS expander 320, upon detecting the valid key in storage device 310, removes an artificially applied processing limit from SAS expander 320 (or another device), thereby increasing its speed and efficiency. In a further embodiment, control unit 324 may further delete or otherwise alter the key in order to ensure that it is not used multiple times by multiple devices.

In a still further embodiment, storage device 310 could be used like an actual key in order to iteratively lock and unlock enhanced features at SAS expander 320. For example, when storage device 310 is first connected with SAS expander 320, control unit 324 may enable management functions responsive to detecting that the key is valid. Then, after storage device 310 is removed and coupled again with SAS expander 320, control unit 324 may disable the management functions responsive to detecting that the key is valid. Thus, storage device 310, particularly when it comprises a portable "USB key" or "flash drive," can be used as a physical key within SAS domain 300.

It may be beneficial to utilize such features described above via USB devices and protocols, because SAS implementations of such features may require vendor-specific, complex commands. In contrast, in USB, more standardized commands can be used to assemble such kinds of security functionality.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system for managing a Serial Attached SCSI (SAS) domain via Universal Serial Bus (USB) communications, comprising:
   a SAS expander comprising:
      a plurality of physical links;
      a USB interface; and
      a control unit operable to receive USB packets via the USB interface, and to detect SAS management information based upon the received USB packets,
      wherein the control unit is further operable to acquire passcode data from a storage device coupled to the SAS expander via the USB interface, to determine whether the passcode data is valid, and to alter a configuration of the SAS domain based upon the SAS management information determined from the USB packets responsive to determining that the passcode data is valid.

2. The system of claim 1, wherein:
   the control unit is further operable to determine the SAS management information by directly translating the USB packets into SAS management information.

3. The system of claim 1, wherein:
   the control unit is further operable to determine the SAS management information by processing the USB packets, detecting SAS frames wrapped within the USB packets, removing the wrapped SAS frames, and processing the SAS frames to determine SAS management information.

4. The system of claim 1 wherein:
   the control unit is further operable to detect a storage device coupled to the SAS expander via the USB interface, and to store configuration data for the SAS domain at the storage device.

5. The system of claim 1 wherein:
   the control unit is further operable to detect a storage device coupled to the SAS expander via the USB interface, and to utilize configuration data in the storage device to configure the SAS domain.

6. The system of claim 1 wherein:
   the configuration data for the SAS domain includes information comprising SAS addressing parameters.

7. The system of claim 1 wherein:
   the control unit is further operable to detect a storage device coupled to the SAS expander via the USB interface, further operable to acquire log data from devices coupled to the SAS expander via the plurality of physical links, and further operable to utilize the USB interface of the SAS expander to store the log data in the storage device.

8. The system of claim 1 wherein:
   the control unit is further operable to detect that the storage device has been decoupled from the SAS expander, and to prevent further changes to the configuration of the SAS domain responsive to detecting that the storage device has been decoupled from the SAS expander.

9. A method for managing a Serial Attached SCSI (SAS) domain via Universal Serial Bus (USB) communications, comprising:
   receiving, at a USB interface of a SAS expander, USB packets;
   detecting, via a control unit of the SAS expander, SAS management information based upon the received USB packets;
   acquiring passcode data from a storage device coupled to the SAS expander via the USB interface;
   determining whether the passcode data is valid; and
   altering a configuration of the SAS domain based upon the SAS management information determined from the USB packets, responsive to determining that the passcode data is valid.

10. The method of claim 9, wherein determining the SAS management information comprises:
    directly translating the USB packets into SAS management information.

11. The method of claim 9, wherein determining the SAS management information comprises:
    processing the USB packets;
    detecting SAS frames wrapped within the USB packets;
    removing the wrapped SAS frames; and
    processing the SAS frames to determine SAS management information.

12. The method of claim 9, further comprising:
    detecting a storage device coupled to the SAS expander via the USB interface; and
    storing configuration data for the SAS domain at the storage device.

13. The method of claim 9, further comprising:
    detecting a storage device coupled to the SAS expander via the USB interface; and
    utilizing configuration data in the storage device to configure the SAS domain.

14. The method of claim 9, wherein:
    the configuration data for the SAS domain includes information comprising SAS addressing parameters.

15. The method of claim 9, further comprising:
    detecting a storage device coupled to the SAS expander via the USB interface;
    acquiring log data from devices coupled to the SAS expander; and utilizing the USB interface of the SAS expander to store the log data in the storage device.

16. The method of claim 9, further comprising:
detecting that the storage device has been decoupled from the SAS expander; and
preventing further changes to the configuration of the SAS domain responsive to detecting that the storage device has been decoupled from the SAS expander.

17. A non-transitory computer readable medium embodying programmed instructions which, when executed by a processor, are operable for performing a method within a Serial Attached SCSI (SAS) expander for managing a SAS domain via Universal Serial Bus (USB) communications, the method comprising:
receiving, at a USB interface of a SAS expander, USB packets;
detecting, via a control unit of the SAS expander, SAS management information based upon the received USB packets;
acquiring passcode data from a storage device coupled to the SAS expander via the USB interface;
determining whether the passcode data is valid; and
altering a configuration of the SAS domain based upon the SAS management information determined from the USB packets, responsive to determining that the passcode data is valid.

18. The medium of claim 17, wherein determining the SAS management information comprises:
directly translating the USB packets into SAS management information.

19. The medium of claim 17, wherein determining the SAS management information comprises:
processing the USB packets;
detecting SAS frames wrapped within the USB packets;
removing the wrapped SAS frames; and
processing the SAS frames to determine SAS management information.

20. The medium of claim 17, wherein the method further comprises:
detecting a storage device coupled to the SAS expander via the USB interface; and
storing configuration data for the SAS domain at the storage device.

* * * * *